United States Patent [19]
Santini et al.

[11] Patent Number: 5,981,626
[45] Date of Patent: Nov. 9, 1999

[54] WASHABLE COLORING COMPOSITION SUITABLE FOR USE IN DRY ERASE MARKERS

[75] Inventors: Andree F. Santini, Easton, Pa.; Richard E. Miller, Palm Coast, Fla.

[73] Assignee: Binney & Smith Inc., Easton, Pa.

[21] Appl. No.: 08/800,755

[22] Filed: Feb. 14, 1997

[51] Int. Cl.$^6$ .......................... C09D 11/00; C09D 11/16; C09D 161/10

[52] U.S. Cl. .................. 523/161; 106/31.27; 106/31.32; 106/31.13; 106/31.57

[58] Field of Search .......................... 106/31.01, 31.13, 106/31.27, 31.32, 31.57, 32.5, 34, 287.1; 523/160, 161, 164; 524/81, 86, 186

[56] References Cited

U.S. PATENT DOCUMENTS

| | | |
|---|---|---|
| Re. 33,365 | 10/1990 | Blyth et al. . |
| 2,683,647 | 7/1954 | Hagan . |
| 2,690,953 | 10/1954 | Livak et al. . |
| 2,920,975 | 1/1960 | Livak . |
| 3,154,534 | 10/1964 | Gale et al. . |
| 3,154,535 | 10/1964 | Graham et al. . |
| 3,157,633 | 11/1964 | Kuhn . |
| 3,337,524 | 8/1967 | Green et al. . |
| 3,468,679 | 9/1969 | Furlotti ..................................... 106/22 |
| 3,507,850 | 4/1970 | Cohen et al. . |
| 3,663,262 | 5/1972 | Cogan, Jr. . |
| 3,834,823 | 9/1974 | Seregely et al. . |
| 3,900,283 | 8/1975 | Hildebrand et al. . |
| 3,949,132 | 4/1976 | Seregely et al. . |
| 4,025,303 | 5/1977 | Prazak . |
| 4,042,401 | 8/1977 | Newmann et al. . |
| 4,097,233 | 6/1978 | Takahashi . |
| 4,128,544 | 12/1978 | Schneider . |
| 4,163,675 | 8/1979 | Hirano et al. . |
| 4,193,906 | 3/1980 | Hatanaka . |
| 4,202,838 | 5/1980 | Lauton et al. . |
| 4,256,494 | 3/1981 | Tamamoto et al. . |
| 4,256,598 | 3/1981 | Sakkab . |
| 4,270,236 | 6/1981 | Zurbuchen et al. . |
| 4,273,554 | 6/1981 | Abel . |
| 4,283,195 | 8/1981 | Nakatsuka et al. . |
| 4,288,363 | 9/1981 | Hurter . |
| 4,349,349 | 9/1982 | Nakatsuka et al. . |
| 4,371,371 | 2/1983 | Smrekar . |
| 4,382,111 | 5/1983 | Kuwayama et al. . |
| 4,411,666 | 10/1983 | Hashizume et al. . |
| 4,413,998 | 11/1983 | Guth . |
| 4,465,492 | 8/1984 | Putzar . |
| 4,487,610 | 12/1984 | Mausezahl . |
| 4,501,591 | 2/1985 | Ucci et al. . |
| 4,505,944 | 3/1985 | Turner . |
| 4,525,216 | 6/1985 | Nakanishi . |
| 4,560,745 | 12/1985 | Weberndoerfer et al. . |
| 4,563,190 | 1/1986 | Töpfl . |
| 4,578,117 | 3/1986 | Nakanishi . |
| 4,589,885 | 5/1986 | Opitz . |
| 4,592,940 | 6/1986 | Blyth et al. . |
| 4,664,711 | 5/1987 | Kawaguchi et al. . |
| 4,680,212 | 7/1987 | Blyth et al. . |
| 4,689,078 | 8/1987 | Koike et al. . |
| 4,721,739 | 1/1988 | Brenneman et al. . |
| 4,740,549 | 4/1988 | Okuzono et al. . |
| 4,753,658 | 6/1988 | Okuzono et al. . |
| 4,789,399 | 12/1988 | Williams et al. . |
| 4,875,901 | 10/1989 | Payet et al. . |
| 4,908,149 | 3/1990 | Moore et al. . |
| 4,940,628 | 7/1990 | Lin et al. . |
| 4,940,757 | 7/1990 | Moss, III et al. . |
| 4,954,174 | 9/1990 | Imagawa . |
| 4,981,516 | 1/1991 | Kluger et al. . |
| 4,988,123 | 1/1991 | Lin et al. . |
| 5,004,763 | 4/1991 | Imagawa . |
| 5,009,667 | 4/1991 | Beck et al. . |
| 5,015,259 | 5/1991 | Moss, III et al. . |
| 5,030,245 | 7/1991 | Hemling et al. . |
| 5,043,013 | 8/1991 | Kluger et al. . |
| 5,059,244 | 10/1991 | King et al. . |
| 5,061,763 | 10/1991 | Moss, III et al. . |
| 5,074,883 | 12/1991 | Wang . |
| 5,100,471 | 3/1992 | Winnik et al. . |
| 5,116,410 | 5/1992 | Miller . |
| 5,120,359 | 6/1992 | Uzukawa et al. . |
| 5,131,776 | 7/1992 | Mott . |
| 5,137,453 | 8/1992 | Hudson . |
| 5,169,437 | 12/1992 | You . |
| 5,203,913 | 4/1993 | Yamamoto et al. . |
| 5,215,576 | 6/1993 | Carrick . |
| 5,217,255 | 6/1993 | Lin et al. . |
| 5,288,160 | 2/1994 | Li et al. . |
| 5,316,574 | 5/1994 | Fujita et al. . |
| 5,318,617 | 6/1994 | Nasagawa et al. . |
| 5,324,764 | 6/1994 | Fujita et al. . |
| 5,334,649 | 8/1994 | Fujita . |
| 5,338,793 | 8/1994 | Loftin . |
| 5,378,752 | 1/1995 | White et al. ............................ 524/418 |

(List continued on next page.)

FOREIGN PATENT DOCUMENTS

| | | |
|---|---|---|
| 0 322 805A | 7/1989 | European Pat. Off. . |
| 0 557 115 | 8/1993 | European Pat. Off. . |
| 0 557 115A | 8/1993 | European Pat. Off. . |
| 0 584 735A | 3/1994 | European Pat. Off. . |
| 63-165465 | 7/1988 | Japan . |
| 63-165468 | 7/1988 | Japan . |
| 2 040 808A | 9/1980 | United Kingdom . |
| WO 90/12067 | 10/1990 | WIPO . |
| WO 91/02788 | 3/1991 | WIPO . |
| WO 93/24565 | 12/1993 | WIPO . |

*Primary Examiner*—Vasu Jagannathan
*Assistant Examiner*—Callie E. Shosho
*Attorney, Agent, or Firm*—Leydig, Voit & Mayer, Ltd.

[57] ABSTRACT

A washable dry erase coloring composition comprising an acid dye or polymeric dye colorant, a dye vehicle, a release agent, and a dyeblocker additive. The dyeblocker additive is either a sulfonated naphthalene condensation product or a sulfonated phenol-formaldehyde condensation product. The dry erase coloring composition is suitable for use in marking on a whiteboard and enhances fugitivity from skin and fabrics. The dry erase coloring composition may optionally contain a film forming resin. More specifically, the invention is, in one preferred embodiment, a washable erasable whiteboard marker ink comprising an acid dye or polymeric dye, water, a film forming resin, a release agent and a sulfonated phenol-formaldehyde condensation product.

31 Claims, No Drawings

U.S. PATENT DOCUMENTS

| | | |
|---|---|---|
| 5,389,717 | 2/1995 | Santini et al. . |
| 5,412,021 | 5/1995 | Nakanishi . |
| 5,486,228 | 1/1996 | Miller et al. .............................. 106/22 |
| 5,510,415 | 4/1996 | Zahrobsky et al. . |
| 5,561,175 | 10/1996 | Imagawa . |
| 5,571,311 | 11/1996 | Belmont et al. . |
| 5,587,408 | 12/1996 | Burns et al. ............................ 523/160 |
| 5,677,363 | 10/1997 | Imagawa ................................. 523/161 |
| 5,744,519 | 4/1998 | Heraud et al. ......................... 523/160 |
| 5,900,094 | 5/1999 | Santini et al. .......................... 156/230 |

WASHABLE COLORING COMPOSITION SUITABLE FOR USE IN DRY ERASE MARKERS

FIELD OF THE INVENTION

The present invention relates generally to the field of washable dry erase coloring compositions for drawing and coloring purposes. In one particular aspect, the invention relates to writing instruments containing washable liquid coloring compositions, and more specifically to the formulations of coloring compositions for use in markers. Further, washable coloring compositions are provided which are suitable for use on whiteboards.

BACKGROUND OF THE INVENTION

Whiteboards, also known as dry erase boards, are commonly used in offices, schools, and other locations were a chalkboard might otherwise be found. Writings on a dry erase board are erasable by wiping lightly with felt, dry cloth or paper. Suitable whiteboard surfaces generally include a melamine, vinyl, polyethylene laminate, or enamel resin layer affixed to a backing. Such whiteboards are characterized in that they have hard, white surfaces that are very smooth in appearance, and are essentially nonporous. Alternatively, a whiteboard may comprise a sheet of polymeric film such as an acrylic or UV curable resin.

A variety of compositions are known for use in writing on impervious writing surfaces such as whiteboards. These coloring compositions suitable for use on whiteboards must erase easily without requiring a comprehensive cleaning. Additionally, the whiteboard compositions must be removable without leaving visible remains commonly termed "ghosting."

Whiteboard coloring compositions suffer from a variety of well known deficiencies. Most whiteboard markers are alcohol-based which may be toxic and, thus, are not appropriate for use by young children. For example, U.S. Pat. Nos. 4,954,174, 5,316,574, and 5,324,764 describe erasable ink compositions for writing on an impervious surface that contain an organic solvent such as an alcohol. Further, many whiteboard markers produce writings which are not readily erasable from whiteboards after the passage of a significant period of time. Finally, current whiteboard markers have a propensity to leave enduring stains on clothing. While permanence is a desirable characteristic of the so-called "permanent" markers, it is one of the most objectionable properties for coloring instruments used by young children.

Water-based marker compositions have been used. U.S. Pat. Nos. 5,412,021 and 5,561,175, for example, describe water-based compositions that contain a pigment, a separating agent, and a water-soluble resin. These aqueous compositions, however, lack fugitivity from fabrics and skin.

It is therefore one general object of the invention to provide a method of imparting skin fugitivity to a dry erase coloring composition.

Another object is to provide a dry erase coloring composition which, in addition to being washable from skin, exhibits enhanced launderability from fabrics.

A related object is to provide non-toxic, dry erase coloring compositions, such as inks, which are suitable for use by young children who may make marks on themselves and their clothing.

A further object of the invention is to provide a coloring composition suitable for use on whiteboards and other non-porous surfaces which is also washable from the skin and clothes.

These and other objects and advantages of the present invention, as well as additional inventive features, will be apparent to those skilled in the art from the following description of the invention and the appended claims.

BRIEF SUMMARY OF THE INVENTION

The discovery of the present invention is that one may incorporate into a coloring composition a dyeblocker additive which imparts to the composition dramatically improved fugitivity from skin. At the same time, it has been discovered that, in many instances, the dyeblocker additive will noticeably enhance fugitivity from fabrics ordinarily used in children's clothing.

In one of its most general aspects, the coloring composition of the invention comprises a colorant selected from the group consisting of an acid dye and a polymeric dye and a dyeblocker. Suitable dyeblockers are aromatic organic sulfonates and are preferably selected from the group consisting of a sulfonated naphthalene condensation product and a sulfonated phenol-formaldehyde condensation product. The coloring compositions of the invention are easily washed from the skin, and, in addition, are also more easily washed from textiles. In another general respect, the present invention includes a method of imparting skin washability to a dye-containing coloring composition by adding to a coloring composition an effective amount of a dyeblocker selected from the group consisting of a sulfonated naphthalene condensation product and a sulfonated phenol-formaldehyde condensation product.

Thus, in one form, the invention is a washable coloring composition comprising an acid dye or polymeric dye colorant, a dye vehicle, a release agent, and a sulfonated phenol-formaldehyde condensation product or a sulfonated naphthalene condensation product. This form of the invention is suitable for use in marking on a whiteboard. Preferably, the inventive coloring composition also contains a film forming resin. More specifically, the invention is, in one preferred embodiment, an erasable whiteboard marker ink comprising an acid dye or polymeric dye colorant, water, a film forming resin, a release agent, and a sulfonated phenol-formaldehyde condensation product. Further, a marker containing the coloring composition of the invention is provided.

DETAILED DESCRIPTION

The washable coloring composition of the present invention comprises an acid dye or polymeric dye colorant, a dye vehicle, a release agent, and a dyeblocker selected from the group consisting of a sulfonated phenol-formaldehyde condensation product and a sulfonated naphthalene condensation product. Preferably, the coloring composition also contains a film forming resin. These washable coloring compositions exhibit enhanced fugitivity from skin and fabrics. This coloring composition is suitable for use for marking on whiteboards and may be easily erased by ordinary means with no apparent ghosting.

The dyeblocker components imparts skin fugitivity and, in some instances, enhanced fabric fugitivity to the coloring compositions of the invention. The dyeblocker can be an aromatic organic sulfonate and more preferably an aromatic organic sulfonate other than an alkyl benzene sulfonate. One group of preferred dyeblockers are sulfonated phenol-formaldehyde condensation products, sulfonated naphthalene condensation products, or mixtures thereof. The dyeblockers useful in the practice of the present invention do not impair the stability of the coloring compositions of the invention. By stability, it is meant that the coloring composition, which includes the condensation product additive, must not precipitate nor exhibit a marked change in color or pH when maintained at a temperature of 140° F. for two weeks. In addition, it is preferred to use dyeblockers which, in addition to imparting fugitivity from skin, also enhance fugitivity from textiles.

Sulfonated phenol-formaldehyde condensation product dyeblockers useful in the practice of the invention are described in U.S. Pat. No. 4,501,591, the disclosure of which is incorporated herein by reference. Suitable sulfonated phenol-formaldehyde condensation products may be, but are not limited to, linear, low molecular weight condensation products; that is products having an average molecular weight of less than about 1000, for example, in the range of 250 to 700. Such products are water-soluble and may be prepared by conventional art-recognized techniques, for example, by condensation of formaldehyde with one or more phenols in a mole ratio of about 1.0 to 0.8, phenol(s) to formaldehyde, at a pH of less than 7 using an acid catalyst such as HCl, wherein at least one of the phenols is a phenolsulfonic acid or alkali metal salt thereof. Preferably, the phenols comprise, in addition to the sulfonic acid or salt thereof, a sulfone, for example, dihydroxy aromatic diphenol sulfone. Such condensation products contain, in addition to sulfonic acid groups or alkali metal salts thereof, sulfone groups.

Other sulfonated phenol-formaldehyde condensation products are described in U.S. Pat. No. 33,365, and U.S. Pat. Nos. 4,592,940 and 4,680,212, the disclosures of which are incorporated herein by reference.

A sulfonated phenol-formaldehyde condensation product dyeblocker useful in the present invention is Aerofix N™, commercially available from Aerochem Corporation. Aerofix N is supplied as an aqueous dispersion of the phenol-formaldehyde condensation product containing about 17% by weight active condensation product ingredients. Other useful sulfonated phenol-formaldehyde condensation products are Intratex N™ available from Crompton and Knowles Corporation (dispersion containing about 18% by weight active condensation product ingredient), and Gascofix NY™ available from GCI Technologies, Inc. (dispersion containing about 29% by weight active condensation product ingredient). Compatible mixtures of these sulfonated phenol-formaldehyde condensation products may also be used. The sulfonated phenol-formaldehyde condensation product, Aerofix N™, is preferred. Aerofix N™ dramatically enhanced skin washability and fabric launderability in compositions of the invention. Other sulfonated phenol-formaldehyde condensation products may produce equivalent, or even better, results and are within the scope of the invention.

A sulfonated naphthalene condensation product dyeblocker useful in the coloring compositions of the invention is Tamol SN™. Tamol SN™ is commercially available from Rohm and Haas and supplied in solid form containing 100% active ingredient. Other sulfonated naphthalene condensation products may produce equivalent, or even better, results and are within the scope of the invention. The various dyeblockers discussed above may be used alone or in combination where the dyeblockers are compatible with each other.

The specific mechanism by which the dyeblocker additive imparts skin fugitivity and enhance fabric fugitivity is not known. However, it is believed that the condensation products tie up the reactive sites of these substrates, such that the dye used as a colorant in compositions of the invention has a reduced ability to physically or chemically associate with skin or fabric.

The sulfonated phenol-formaldehyde condensation product Aerofix N™ was tested in numerous water-based dye compositions comprising colorants, preservatives, and humectants. Compositions of the invention should contain a sufficient amount of the sulfonated phenol-formaldehyde condensation product to impart skin fugitivity and enhance fabric fugitivity to the composition.

The amount of dyeblocker additive present in the coloring compositions of the invention depends upon the specific condensation product used. At a minimum, the condensation product must be present in an amount sufficient to impart enhanced skin and fabric fugitivity. This effect is seen with as little as about 1% by weight of the active condensation product ingredient in the dry erase coloring composition, but is better starting at about 3.5% by weight of the active sulfonated phenol-formaldehyde condensation product ingredient where the dyeblocker additive is Aerofix N™. In general, a greater amount of condensation product additive present in the dry erase coloring composition leads to better washability from fabric and skin. However, at a certain point, the addition of more condensation product does not yield any improvement in the washability of the dry erase composition. The upper limit of the dyeblocker additive concentration may also be imposed by constraints on the viscosity and the long term stability of the composition. For example, the dry erase coloring composition cannot have a significantly viscous consistency or it will not flow through a marker nib. Accordingly, the concentration of condensation product additive is preferably in the range of from about 2% to about 15% by weight of the active condensation product ingredient of the total coloring composition.

In general, where the Aerofix N™ dispersion is used, the beneficial effect of the additive occurs at a concentration of at least about 10% by weight of the Aerofix N™ dispersion based on the total coloring composition. Where Aerofix N™ is used, the Aerofix N™ component is preferably present in the range of from about 5% to about 40% by weight of the Aerofix N™ dispersion based on the total coloring composition of the invention, and, most preferably, in the range of from about 15% to about 25% by weight of the Aerofix N™ dispersion based on the total coloring composition.

In the coloring compositions of the invention, a colorant is also used. Suitable colorants are dyes which are preferably selected which otherwise are known to have good launderability from fabrics. When used in the composition of the invention, such dyes not only enhance washability from skin, but also enhance launderability from fabric as well. While certain coloring compositions containing polymeric dyes have been removed from skin and fabric with soap and a significant amount of rubbing, the erasable whiteboard compositions of the present invention can be rinsed off using water alone.

One suitable colorant for use in compositions of the present invention are acid dyes. By way of illustration, and not in limitation, acid dyes that have been found suitable for use in this invention are Acid Violet 12, Acid Green 3, Acid Blue 9, Acid Yellow 17, Acid Yellow 23 and Acid Red 388. Yellow F.D.& C. #6 may also be used.

Another category of suitable colorants (also known as chromophores) for use in the present invention are polymeric dyes. These colorants are characterized as having polymeric chains covalently bonded to a chromophore molecule. By way of illustration, and not limitation, polymeric dyes suitable for use in this invention include Palmer Scarlet™, Palmer Blue™, Palmer Magenta™, and Experimental Palmer FL Red A 10™. These polymeric dyes are commercially available from Milliken Chemical and may be covered by one or more of U.S. Pat. Nos. 4,981,516, 5,043,013, and 5,059,244, the disclosures of which are incorporated herein by reference. Other polymeric dyes useful in the practice of the invention include polyalkyleneoxy-substituted chromophore compounds such as, for example, alkyleneoxy-substituted methine colorants.

The inventive coloring compositions may contain either polymeric dyes, acid dyes, or mixtures thereof. Additionally, the compositions may contain two or more polymeric dyes or two or more acid dyes to achieve the desired color. The colorant is preferably present in an amount of from about 2% to about 20% by weight of the total coloring composition of the invention. The minimum concentration of colorant which will produce a workable coloring composition is governed by the color intensity desired, though as little as 0.5% colorant may be sufficient for certain applications. The maximum workable concentration of colorant is determined largely by the ability to maintain a stable composition, and can vary widely depending upon the concentration of other components. It is also a function of the characteristics of the desired end product, though a practical upper limit in the formulation of the composition of the invention as, for example, an erasable whiteboard marker ink, is about 30% by weight of the total coloring composition of the invention since higher concentrations may cause board staining (i.e., ghosting) and an undesirably high viscosity. Preferably, the dry erase coloring composition should have a viscosity less than 6 cps when used as a dry erase marker ink. For whiteboard applications, too much dye raises the viscosity and makes it difficult to add a sufficient amount of film forming resin and/or dyeblocker necessary to yield the desired washability.

The coloring composition of the present invention also contains an amount of an aqueous or other dye vehicle effective to form a dispersion of the remaining components. The preferred dye vehicle is water. The upper limit of the proportion of water is the amount which will dilute the composition sufficiently to form a mark having the minimum acceptable visibility on a substrate. The minimum amount of water is that necessary to disperse the other components and provide a composition which can be freely dispensed from the selected dispensing element. Other suitable dye vehicles include alcohol, for example, a 30% denatured alcohol solution. Compatible mixtures of alcohol and water may also be used as a dye vehicle. The proportion of dye vehicle contemplated herein is from about 30% to about 90% by weight of the total coloring composition of the invention. Some or all of the water may be contributed by other components.

The coloring compositions of the invention may also contain a release agent. Where the coloring compositions of the invention are to be used to create marks on a whiteboard, the release agent itself forms a separating film between the surface of the whiteboard and the film forming resin. The film forming resin does not form on the surface of the board, but instead on top of the release agent. As a result, the film forming resin, containing the colorant, may be erased with a dry cloth or eraser. Typical release agents include, but are not limited to, siloxanes, such as polydimethylsiloxanes; polyethylene glycols; monobasic higher fatty carboxylic acid esters; mono- or diesters of dihydric alcohols, wherein the ester has a molecular weight of 100 or more; fatty acid triglycerides; higher hydrocarbons such as paraffin and squalene; polyesters and polyethers having molecular weights of 400 or more; and esters of a polycarboxylic acid with an alcohol.

The preferred release agents are polyalkylene oxide-modified polydimethylsiloxanes sold under the trade name Silwet L-7230™ and Silwet L-7607™ by OSi Specialties, Inc. Other useful release agents include, but are not limited to, Silwet L-7608™ marketed by OSi Specialties, Inc., DCQ43667™ and FF400™ marketed by Dow Corning, Carbowax™ Polyethylene Glycol 1450 marketed by Union Carbide, and Lipopeg 4L™ marketed by Lipo Chemicals Inc. Mixtures of these release agents may also utilized in the dry erase coloring compositions of the present invention. The release agent contained in the erasable whiteboard marker ink composition is present in an amount of from about 2% to about 30% by weight of the total coloring composition and, preferably, in an amount of from about 5% to about 15% by weight of the total coloring composition. At a minimum, the release agent must be present in compositions of the invention to be used on whiteboards in an adequate amount to produce compositions that can are easily erasable from the whiteboard. However, when excessive amounts of release agent are used, the composition has an excessively high viscosity, which may render the composition unsuitable for use in conventional markers.

The coloring compositions of the invention may optionally contain a resin which is water soluble and film forming at room temperature. When marks are formed using the composition of the invention including this film forming resin, and dried on an impervious writing surface, the marks have a continuous resin layer. The water soluble film forming resin also provides the coloring composition with a viscosity suitable for writing when the composition is used in the form of a whiteboard marker ink and helps to prevent staining of the whiteboard. It is also believed that the dyeblocker condensation product additives of the present invention may also serve as a film-former upon which the dye is deposited.

The preferred film forming resin for use in the present invention is polyvinylpyrrolidone sold under the trade name PVP K-15™ by GAF Chemicals Corporation. PVP K-15™ is typically supplied in 30% solution of polyvinylpyrrolidone (i.e., 70% water). Different molecular weight polyvinylpyrrolidone polymers, such as PVP K-30™, and modified polyvinylpyrrolidone polymers, such as polyvinyl acetate-modified polyvinylpyrrolidone, may also be used. Additional useful film forming resins include, for example, but are not limited to, natural resins, such as gum arabic, rosin, or shellac; modified rosins such as rosin esters, hydrogenated rosins, rosin-modified maleic acid resins or rosin-modified phenol resins; various phenol-resins; cellulosic resins such as ethyl cellulose resins or acetyl cellulose resins; ketone resins, polyvinyl alcohol, polyvinyl acetate resins, petroleum resins, polyvinyl butyral resins, vinylpyrrolidone-vinyl acetate copolymer resins or polyacrylic acid ester resins. Mixtures of two or more of these film forming resins may also be employed in the present invention.

The film forming resin should be used in an effective amount. Preferably, the film forming resin is contained in the coloring composition suitable for use on whiteboards is present in an amount of from about 0% to about 10% by weight of the active film forming resin added of the total coloring composition and, preferably, in an amount of from about 1% to about 5% by weight of the active film forming resin based on the total composition of the coloring composition of the invention. Where the film forming resin used is the polyvinylpyrrolidone supplied in solution as PVP K-15™, from about 0% to about 30% by weight of the PVP K-15™ solution based on the total weight of the coloring composition may be used and, preferably, from about 5% to about 15% by weight of the PVP K-15™ solution is used based on the total weight of the coloring composition. The actual amount of film forming resin added to the coloring compositions of the invention depends upon the particular colorant used. When the amount of film forming resin is too large, the resultant dry erase coloring composition has an excessively high viscosity so that it writes poorly and, moreover, the writings formed therewith are not readily erased from a whiteboard.

The inventive dry erase coloring composition can be used as an erasable whiteboard marker ink in which the dye vehicle is water. The erasable whiteboard marker ink can be supplied in a delivery system, such as a marking instrument, to enable children to color or draw on impervious surfaces such as whiteboards. Suitable nibs for use in such a system are bonded fiber or sintered plastic nibs.

Also provided in the instant invention is a marking pen containing the coloring composition of the invention in the form of an ink. The marking pen generally may use any conventional marker. Preferably, the marker barrel uses a bonded fiber or sintered plastic nib. The marker reservoir containing the ink can be any standard marker delivery system including, but not limited to, acetate, polyester, or polypropylene fiber systems or a fiberless system may be used.

In a preferred embodiment of invention, the coloring composition of the invention is in the form of an erasable whiteboard marker ink. The ink contains a colorant, water, a release agent, a film forming resin, and a dyeblocker additive selected from a sulfonated naphthalene condensation product, a sulfonated phenol-formaldehyde condensation product, and mixtures thereof. This inventive whiteboard marker ink exhibits favorable dry erase characteristics and lacks ghosting on most whiteboards. The fugitivity of this whiteboard marker ink from skin and fabric is also excellent.

Compositions of the present invention may, when in the form of an erasable whiteboard marker ink, also advantageously include a humectant, a surfactant, a preservative, a defoamer, and/or a pH regulant. These materials and their functions are well known, and their mention here is by way of illustration only. Generally, any effective amount of the additive may be used so long as the stability of the coloring composition is not adversely affected and the composition is suitable for use in the desired end product.

For example, it may be possible to include a humectant in an erasable whiteboard marker ink to retard the evaporation of water from the ink solution. This avoids unduly rapid drying of the ink in the marker nib which can cause clogging of the nib and impair the function of the marker. Further, a humectant may improve freeze/thaw stability of the inventive ink compositions. Typical humectants include polyhydric alcohols such as glycerine, propylene glycol, ethylene glycol, and diethylene glycol, hydroxylated starches, low molecular weight (m.w.=200–400) poly(ethylene glycols), and mixtures of these materials. Any effective amount of humectant may be used although a generally useful concentration range for these humectants is from about 5% up to about 30% by weight of the total coloring composition.

Surfactants in any effective amount (generally up to about 0.1% by weight) are also useful in the preferred marker ink or erasable whiteboard marker ink compositions of the invention for the purpose of adjusting such properties as viscosity (for proper dispensing of ink through the nib), and surface tension (for good flow properties and whiteboard wetting). Nonionic surfactants, such as poly (ethylene glycol) ether, alkylaryl polyether alcohol, fluorinated alkyl esters, and mixtures of such materials are preferred for use in marker inks or erasable whiteboard marker inks.

Preservatives of conventional types are also advantageously employed in the compositions of the invention when used as an erasable whiteboard marker ink to extend the shelf life of the composition. The preservative preferably serves as both a bactericide and a fungicide. Some typical preservatives useful in the present invention include methyl p-hydroxybenzoate, glutaraldehyde, hydroxybenzoic acid esters, 3-iodo-2-propynyl butyl carbamate, bicyclic oxazolidones, and a biocide comprising as the active ingredients 5-chloro-2-methyl-4-isothiazolin-3-one and, 2-methyl-4-isothiazolin-3-one.

Preservatives are usually effective when present in any effective amount but generally are present in amounts of from about 0.1% up to about 1% by weight. Preferred preservatives include Kathon PFM™ (isothiazolinones) manufactured by Rohm and Haas, and Nuosept 95™ (bicyclic oxazolidines solutions) manufactured by Huls America.

The pH of the coloring compositions of the present invention is preferably in the range of about 7.0 to 9.0, more preferably about 8.0 to 8.5. To maintain this basic pH, a pH regulant may be employed. Preferably, neutralized versene is used as a pH regulant. In addition to controlling pH, neutralized versene may also help ease the erasability of some dyes from whiteboards when compositions of the invention are used as whiteboard marker inks. The pH regulant may be added in an amount ranging from about 0% to about 20% by weight. In one preferred composition, the pH regulant, neutralized versene, is added in an amount of about 10% by weight of the total erasable whiteboard marker ink composition.

Additionally, the coloring compositions of the present invention may also contain a defoamer to prevent foaming during mixture of the various components. Suitable defoamers include silicones and siloxanes. The preferred defoamer is Tego Foamax 800™ marketed by Goldschmidt Chemical Corp. Other suitable defoamers include Zerofome AF-200™ marketed by NuTech Corp, Surfynol DF58™ marketed by Air Products, and Foamaster H™ marketed by Henkel. The addition of defoamer to the coloring compositions of the present invention does not adversely affect the removability of these compositions from whiteboards when the compositions are used as whiteboard marker inks. The amount of defoamer depends upon the amounts of other components present in the coloring composition, although typically about 0.1% to about 5% by weight of the total coloring composition is used.

EXAMPLES

Examples of coloring compositions of the present invention are as follows. These examples further illustrate the present invention but, of course, should not be construed as in any way limiting its scope. Quantities are in percent by weight of the total composition. These example compositions are suitable for use in marking on whiteboards.

Different coloring compositions were prepared using acid and polymeric dyes and a dyeblocker condensation product additive. These compositions were formulated in the form of marker inks. These compositions containing a film forming resin, a release agent, and dyeblocker condensation product additive are set forth below in Examples 1–8. In examples 1–2 and 4–8, the dyeblocker additive is the sulfonated phenol-formaldehyde condensation product, Aerofix N™. In example 3, the dyeblocker additive is the sulfonated naphthalene condensation product, Tamol SN™.

Example 1—Red

| Component | wt. % |
| --- | --- |
| Deionized water (dye vehicle) | 52.54 |
| Palmer Scarlet (polymeric dye) | 9.99 |
| Palmer FL Red A1O (polymeric dye) | 2.00 |
| Aerofix N (phenol-formaldehyde condensation product) | 19.97 |
| PVP K-30 (30% solution) (film forming resin) | 5.14 |
| Silwet L-7607 (release agent) | 9.99 |
| Nuosept 95 (preservative) | 0.30 |
| Kathon PFM (preservative) | 0.08 |

Example 2—Blue

| Component | wt. % |
| --- | --- |
| Deionized water (dye vehicle) | 44.62 |
| Palmer Blue (polymeric dye) | 5.00 |
| Aerofix N (phenol-formaldehyde condensation product) | 20.00 |
| PVP K-15 (30% solution) (film forming resin) | 10.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 3—Yellow

| Component | wt. % |
| --- | --- |
| Deionized water (dye vehicle) | 72.62 |
| Acid Yellow 23 (acid dye) | 2.00 |
| Tamol SN (naphthalene condensation product) | 5.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 4—Green

| Component | wt. % |
| --- | --- |
| Deionized water (dye vehicle) | 55.62 |
| Palmer Blue (polymeric dye) | 3.20 |
| Acid Yellow 23 (acid dye) | 0.80 |
| Aerofix N (phenol-formaldehyde condensation product) | 20.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 5—Black

| Component | wt. % |
| --- | --- |
| Deionized water (dye vehicle) | 39.82 |
| Palmer Blue (polymeric dye) | 4.40 |
| Palmer Magenta (polymeric dye) | 4.40 |
| FD&C Yellow #6 (acid dye) | 1.00 |
| Aerofix N (phenol-formaldehyde condensation product) | 20.00 |
| PVP K-15 (30% solution) (film forming resin) | 10.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 6—Orange

| Component | wt. % |
| --- | --- |
| Deionized water (dye vehicle) | 56.62 |
| FD&C Yellow #6 (acid dye) | 3.00 |
| Aerofix N (phenol-formaldehyde condensation product) | 20.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 7—Violet

| Component | wt. % |
| --- | --- |
| Deionized water (dye vehicle) | 46.42 |
| Palmer Magenta (polymeric dye) | 3.20 |
| Aerofix N (phenol-formaldehyde condensation product) | 20.00 |
| PVP K-15 (30% solution) (film forming resin) | 10.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 8 —Brown

| Component | wt. % |
| --- | --- |
| Deionized water (dye vehicle) | 42.06 |
| Palmer Blue (polymeric dye) | 0.88 |
| FD&C Yellow #6 (acid dye) | 1.00 |
| Palmer Scarlet (polymeric dye) | 5.68 |
| Aerofix N (phenol-formaldehyde condensation product) | 20.00 |
| PVP K-15 (30% solution) (film forming resin) | 10.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

TEST PROCEDURES

1. Skin Fugitivity

The fugitivity from skin of the compositions of the invention was measured by the following test:

1. Wash hands with soap and warm water. The pre-stain cleansing removes excess oil and dirt from the skin and provides a more consistent skin surface for testing. Allow the skin to dry for 30 seconds.

2. With the compositions of the invention used in a marker having a sintered plastic nib, draw a stripe on the palm of the hand with the flat side of the nib. In the usual case, a ¼ inch wide by 1 inch long stripe works well. Apply enough pressure and/or multiple passes to develop a stripe with good color intensity. If it is desired to make a comparison among two or more compositions, more than one stripe may be drawn. Let stripes dry for fifteen minutes.

3. In the case of a marker, place hand under tap and briefly rinse off excess ink with warm water.

4. Wash hands with Ivory brand bar soap in the following manner: lather using a minimum amount of soap; replace soap in soap dish; rub hands together briskly with modest pressure for 30 seconds; rinse away soap.

5. Wipe hands dry with paper towels, and complete the drying with a relatively dry towel. A dry towel will help to rub off residual traces of ink.

2. Fabric Fugitivity

The fugitivity from fabric of the compositions of the invention was measured by the following test.

1. Pre-wash test fabrics with bleach, non-staining water softener and ordinary household phosphate detergent powder using 120° F. hot water as directed in ASTM D4265-83, and dry.

2. Cut test swatches of pre-washed fabrics to be tested.

3. Deposit marker inks onto fabric swatches and allow to dry for 4 hours.

4. Staple a group of stained swatches to the edges of a bath towel.

5. Add a dummy load of unstained fabrics to provide a four pound wash load. Wash the load in a washing machine for 12 minutes with a warm (about 80° F. to about 90° F.)/cold cycle or a cold (about 35° F. to about 55° F.)/cold cycle.

6. Dry the load in a dryer.

7. Detach the test swatches from the carrier towel, iron, and observe degree of staining.

EVALUATION OF TEST DATA

Skin and fabric fugitivity data are based on a visual rating system as follows:

0=no stain (rinse with soap and water)

0*=no stain (water rinse only for 30 seconds)

0.5=very light stain (rinse with soap and water)

0.5*=very light stain (water rinse only for 30 seconds)

1=light stain

2=light to moderate stain

3=moderate to heavy stain

4=heavy stain

The viscosity, pH and skin fugitivity of the coloring compositions in Examples 1–8 is set forth in Table I. Skin fugitivity was measured on 14 individuals. As washability results will vary by individual, the range of observed skin fugitivity for each of the coloring compositions examples is provided.

TABLE I

| Example Number | viscosity (cps) | pH | Skin Fugitivity |
| --- | --- | --- | --- |
| 1 | 5.33 | 8.20 | 0, 0*, 0.5* |
| 2 | 4.17 | 7.95 | 0, 0*, 0.5, 0.5*, 1 |
| 3 | 3.17 | 7.50 | 0, 0.5, 0.5* |
| 4 | 3.76 | 8.05 | 0, 0* |
| 5 | 5.56 | 8.00 | 0, 0* |
| 6 | 4.05 | 8.40 | 0, 0*, 0.5, 0.5* |
| 7 | 4.57 | 8.19 | 0, 0*, 0.5* |
| 8 | 5.25 | 8.15 | 0, 0* |

The fabric fugitivity data of the coloring compositions in Examples 1–8 is set forth in Table II. The washability of these inks was tested on 50% cotton/50% polyester blends and 100% cotton. Additionally, washability was examined using a washing machine with both a cold/cold cycle and a warm/cold cycle. The cold/cold cycle was repeated on the fabric samples. As demonstrated, no stains were observed on either the 50% cotton/50% polyester blend or the 100% cotton samples after a second cold wash. For comparison, the fugitivity from fabric of a control coloring composition was analyzed. The control is a typical alcohol-based whiteboard ink composition.

TABLE II

Fabric Fugitivity

|  | Ex 1 | Ex 2 | Ex 3 | Ex 4 | Ex 5 | Ex 6 | Ex 7 | Ex 8 | Cntrl |
|---|---|---|---|---|---|---|---|---|---|
| 50%/50% Blend (1st cold cycle) | 1.5 | 0 | 1 | 1 | 1 | 0.5 | 0.5 | 0.5 | 4 |
| 50%/50% Blend (2nd cold cycle) | 0 | 0 | 0 | 0 | 0 | 0 | 0 | 0 | 3.5 |
| 100% Cotton (1st cold cycle) | 2 | 0 | 1 | 1 | 1.5 | 0.5 | 1.5 | 1 | 4 |
| 100% Cotton (2nd cold cycle) | 0.5 | 0 | 0 | 0 | 0 | 0 | 0 | 0 | 3.5 |
| 50%/50% Blend (warm cycle) | 0 | 0 | 0 | 0 | 0 | 0 | 0 | 0 | 4 |
| 100% Cotton (warm cycle) | 0 | 0 | 0 | 0 | 0 | 0 | 0 | 0 | 4 |

From the foregoing description and examples, it can be seen that the coloring compositions of the present invention containing a dyeblocker exhibit enhanced fugitivity from skin and fabric.

Coloring compositions of the invention containing a dyeblocker condensation product additive other than Aerofix N are set forth below in Examples 9–12. Examples 13–16 below illustrate coloring compositions of the invention that do not contain a film forming resin. Each of these examples is in the form of a marker ink.

Example 9

| Component | wt. % |
|---|---|
| Deionized water (dye vehicle) | 69.62 |
| Palmer Blue (polymeric dye) | 5.00 |
| Intratex N (phenol-formaldehyde condensation product) | 5.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 10

| Component | wt. % |
|---|---|
| Deionized water (dye vehicle) | 66.37 |
| Acid Blue 9 (acid dye) | 1.25 |
| Gascofix NY (phenol-formaldehyde condensation product) | 12.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 11

| Component | wt. % |
|---|---|
| Deionized water (dye vehicle) | 72.62 |
| Acid Yellow 23 (acid dye) | 2.00 |
| Tamol SN (naphthalene condensation product) | 5.00 |
| PVP K-15 (30% solution) (film forming resin) | 10.00 |
| Silwet L-7607 (release agent) | 10.00 |
| Nuosept 95 (preservative) | 0.30 |
| Kathon PFM (preservative) | 0.08 |

Example 12

| Component | wt. % |
|---|---|
| Deionized water (dye vehicle) | 54.82 |
| Palmer Blue (polymeric dye) | 4.40 |
| Palmer Magenta (polymeric dye) | 4.40 |
| FD&C Yellow #6 (acid dye) | 1.00 |
| Tamol SN (naphthalene condensation product) | 5.00 |
| PVP K-15 (30% solution) (film forming resin) | 10.00 |
| Neutralized versene (pH regulant) | 10.00 |
| Silwet L-7607 (release agent) | 10.00 |
| Nuosept 95 (preservative) | 0.30 |
| Kathon PFM (preservative) | 0.08 |

Example 13

| Component | wt. % |
|---|---|
| Deionized water (dye vehicle) | 52.02 |
| Palmer Blue (polymeric dye) | 0.90 |
| Palmer Scarlet (polymeric dye) | 5.70 |
| FD&C Yellow #6 (acid dye) | 1.00 |
| Aerofix N (phenol-formaldehyde condensation product) | 20.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 14

| Component | wt. % |
| --- | --- |
| Deionized water (dye vehicle) | 49.82 |
| Palmer Blue (polymeric dye) | 4.40 |
| FD&C Yellow #6 (acid dye) | 1.00 |
| Palmer Magenta (polymeric dye) | 4.40 |
| Aerofix N (phenol-formaldehyde condensation product) | 20.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 15

| Component | wt. % |
| --- | --- |
| Deionized water (dye vehicle) | 54.62 |
| Palmer Blue (polymeric dye) | 5.00 |
| Aerofix N (phenol-formaldehyde condensation product) | 20.00 |
| Silwet L-7607 (release agent) | 10.00 |
| Neutralized versene (pH regulant) | 10.00 |
| Nuosept 95 (preservative) | 0.30 |
| Kathon PFM (preservative) | 0.08 |

Example 16

| Component | wt. % |
| --- | --- |
| Deionized water (dye vehicle) | 66.62 |
| FD&C Yellow #6 (acid dye) | 3.00 |
| Aerofix N (phenol-formaldehyde condensation product) | 20.00 |
| Silwet L-7607 (release agent) | 10.00 |
| Nuosept 95 (preservative) | 0.30 |
| Kathon PFM (preservative) | 0.08 |

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A washable coloring composition comprising:
   (a) one or more colorants selected from the group consisting of an acid dye, a polymeric dye, and mixtures thereof;
   (b) a dye vehicle;
   (c) a film forming resin;
   (d) a release agent; and
   (e) a dyeblocker in an amount sufficient to enhance the fugitivity of said composition from skin and fabric.

2. The washable coloring composition according to claim 1, wherein said dyeblocker is selected from the group consisting of a sulfonated naphthalene condensation product, a sulfonated phenol-formaldehyde condensation product, and mixtures thereof.

3. The washable coloring composition according to claim 2, wherein said dyeblocker is a sulfonated naphthalene condensation product.

4. The washable coloring composition according to claim 2, wherein said dyeblocker is a sulfonated phenol-formaldehyde condensation product.

5. The washable coloring composition according to claim 1, wherein said one or more colorants is a polymeric dye.

6. The washable coloring composition according to claim 1, wherein said coloring composition is suitable for use on whiteboards.

7. The washable coloring composition according to claim 1, wherein said dye vehicle is water.

8. The washable coloring composition according to claim 1, further comprising a preservative.

9. The washable coloring composition according to claim 8, wherein said preservative is selected from the group consisting of methyl p-hydroxybenzoate, glutaraldehyde, hydroxybenzoic acid esters, 3-iodo-2-propynyl butyl carbamate, bicyclic oxazolidones, a biocide comprising as the active ingredients 5-chloro-2-methyl-4-isothiazolin-3-one and, 2-methyl-4-isothiazolin-3-one, and mixtures thereof.

10. An erasable whiteboard marker ink comprising:
    (a) one or more colorants selected from the group consisting of an acid dye, a polymeric dye, and mixtures thereof;
    (b) water;
    (c) a film forming resin;
    (d) a release agent; and
    (e) a dyeblocker selected from the group consisting of a sulfonated naphthalene condensation product, a sulfonated phenol-formaldehyde condensation product, and mixtures thereof in an amount sufficient to enhance the fugitivity of said composition from skin and fabric.

11. An erasable whiteboard marker ink according to claim 10, wherein said one or more colorants is an acid dye.

12. An erasable whiteboard marker ink according to claim 10, wherein said one or more colorants is a polymeric dye.

13. An erasable whiteboard marker ink according to claim 10, wherein said dyeblocker is a sulfonated naphthalene condensation product.

14. An erasable whiteboard marker ink according to claim 10, wherein said dyeblocker is a sulfonated phenol-formaldehyde condensation product.

15. An erasable whiteboard marker comprising a marker barrel, an ink and a nib, said ink comprising:
    (a) one or more colorants selected from the group consisting of an acid dye, a polymeric dye, and mixtures thereof;
    (b) water;

(c) a film forming resin;

(d) a release agent; and (e) a dyeblocker selected from the group consisting of a sulfonated naphthalene condensation product, a sulfonated phenol-formaldehyde condensation product, and mixtures thereof in an amount sufficient to enhance the fugitivity of said composition from skin and fabric.

16. An erasable whiteboard marker according to claim 15, wherein said one or more colorants is an acid dye.

17. An erasable whiteboard marker according to claim 15, wherein said one or more colorants is a polymeric dye.

18. An erasable whiteboard marker according to claim 15, wherein said dyeblocker is a sulfonated naphthalene condensation product.

19. An erasable whiteboard marker according to claim 15, wherein said dyeblocker is a sulfonated phenol-formaldehyde condensation product.

20. An erasable whiteboard marker according to claim 15, wherein said nib is selected from the group consisting of bonded fiber nibs and sintered plastic nibs.

21. An aqueous erasable whiteboard ink composition suitable for use in a marking instrument, said composition comprising:

(a) one or more colorants selected from the group consisting of an acid dye, a polymeric dye, and mixtures thereof;

(b) a film forming resin in an amount of from about 1% to about 10% by weight of active film forming resin of the total composition;

(c) a release agent in an amount of from about 2% to about 30% by weight of the total composition;

(d) a preservative in an amount of from about 0.1% to about 1% by weight of the total composition;

(e) a sulfonated phenol-formaldehyde condensation product in an amount of from about 2% to about 15% by weight of total composition.

22. A method of imparting skin and fabric fugitivity to a dry erase coloring composition containing an acid dye or polymeric dye, comprising adding to said composition a dyeblocker selected from the group consisting of a sulfonated naphthalene condensation product, a sulfonated phenol-formaldehyde condensation product, and mixtures thereof in an amount sufficient to enhance the fugitivity of said composition from skin and fabric.

23. A washable dry erase coloring composition comprising:

(a) one or more colorants selected from the group consisting of an acid dye, a polymeric dye, and mixtures thereof;

(b) a dye vehicle;

(c) a release agent; and (d) a dyeblocker selected from the group consisting of a sulfonated naphthalene condensation product, a sulfonated phenol-formaldehyde condensation product, and mixtures thereof in an amount sufficient to enhance the fugitivity of said composition from skin and fabric.

24. The washable dry erase coloring composition according to claim 23, further comprising a film forming resin.

25. The washable dry erase coloring composition according to claim 23, wherein said one or more colorants is an acid dye.

26. The washable dry erase coloring composition according to claim 23, wherein said one or more colorants is a polymeric dye.

27. The washable dry erase coloring composition according to claim 23, wherein said dyeblocker is a sulfonated naphthalene condensation product.

28. The washable dry erase coloring composition according to claim 23, wherein said dyeblocker is a sulfonated phenol-formaldehyde condensation product.

29. An erasable whiteboard marker ink comprising:

(a) one or more colorants selected from the group consisting of an acid dye, a polymeric dye, and mixtures thereof;

(b) a dye vehicle;

(c) a release agent; and (d) a dyeblocker selected from the group consisting of a sulfonated naphthalene condensation product, a sulfonated phenol-formaldehyde condensation product, and mixtures thereof in an amount sufficient to enhance the fugitivity of said composition from skin and fabric.

30. An erasable whiteboard marker ink according to claim 29, wherein said dyeblocker is a sulfonated naphthalene condensation product.

31. An erasable whiteboard marker ink according to claim 29, wherein said dyeblocker is a sulfonated phenol-formaldehyde condensation product.

* * * * *